United States Patent
Oommen et al.

(10) Patent No.: US 8,225,245 B2
(45) Date of Patent: Jul. 17, 2012

(54) METHOD OF IMPLEMENTING PHYSICALLY REALIZABLE AND POWER-EFFICIENT CLOCK GATING IN MICROPROCESSOR CIRCUITS

(75) Inventors: Aravind Oommen, Santa Clara, CA (US); Hemanga Das, San Jose, CA (US); Krishnan Sundaresan, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 239 days.

(21) Appl. No.: 12/609,370

(22) Filed: Oct. 30, 2009

(65) Prior Publication Data

US 2011/0107289 A1    May 5, 2011

(51) Int. Cl.
*G06F 9/45* (2006.01)
(52) U.S. Cl. ........ 716/103; 716/104; 716/109; 716/120; 716/132; 716/133
(58) Field of Classification Search .................. 716/103, 716/104, 109, 120, 132, 133
See application file for complete search history.

(56) References Cited

U.S. PATENT DOCUMENTS

| | | | | |
|---|---|---|---|---|
| 6,434,704 | B1 * | 8/2002 | Dean et al. | 713/320 |
| 6,536,024 | B1 * | 3/2003 | Hathaway | 327/295 |
| 7,958,474 | B2 * | 6/2011 | Chen et al. | 716/108 |

* cited by examiner

*Primary Examiner* — Vuthe Siek
*Assistant Examiner* — Brian Ngo
(74) *Attorney, Agent, or Firm* — Osha Liang LLP

(57) ABSTRACT

A method and system of merging gated-clock domains in a semiconductor design includes producing, for each subset of clock gating functions in an initial set of clock gating functions, a set of quantified functions produced by existentially quantifying each clock gating function in the subset over a set of variables that are not part of the support sets of the other clock gating functions of the subset. If the set of quantified functions are equal, selecting one as a super clock gating function and adding it to the set of super clock gating functions. The set of super clock gating functions are sorted according to a criterion and the best is selected and added to the set of final clock gating functions. The remaining super clock gating functions are modified to prevent flip-flops gated by the selected super clock gating function from being gated by remaining super clock gating functions.

15 Claims, 5 Drawing Sheets

METHOD OF IMPLEMENTING PHYSICALLY REALIZABLE AND POWER-EFFICIENT CLOCK GATING IN MICROPROCESSOR CIRCUITS

BACKGROUND OF INVENTION

The reduction of power consumption is an important aspect of high performance microprocessor design. Clock gating reduces power consumption by gating a clock signal when it is not required. Clock gating is typically implemented in the design phase of a circuit by grouping flip-flops that share the same gating function to a clock gating header. The clock gating header receives as input the clock signal and an enable signal that corresponds to the gating function. The clock gating header outputs the gated clock signal to the individual flip-flops of the group in accordance with the gating function.

SUMMARY OF INVENTION

According to one aspect of one or more embodiments of the present invention, a method of merging gated-clock domains in a semiconductor design includes: selecting a set of initial clock gating functions that includes a plurality of clock gating functions, wherein each clock gating function includes a support set of variables. A plurality of subsets of clock gating functions are defined, each subset includes a plurality of clock gating functions from the set of initial clock gating functions. A set of super clock gating functions are defined. A set of final clock gating functions are defined. For each subset of clock gating functions: a set of quantified functions are produced by existentially quantifying each clock gating function in the subset over a set of variables that are not part of the support sets of the other clock gating functions of the subset. If the set of quantified functions are equal, any one of the quantified functions is selected as a super clock gating function. The super clock gating function is added to the set of super clock gating functions. If the set of super clock gating functions contains at least one super clock gating function: the set of super clock gating functions are sorted according to a criterion. The super clock gating function that best achieves the criterion is selected and added to the selected super clock gating function to the set of final clock gating functions. The selected super clock gating function is removed from the set of super gating functions. The remaining super clock gating functions are modified from the set of super clock gating functions by preventing flip-flops gated by the selected super clock gating function from being gated by the remaining super clock gating functions. A gate-level netlist that includes the set of final clock gating functions is output.

According to one aspect of one or more embodiments of the present invention, a method of implementing merged gated-clock domains in a semiconductor design includes: outputting an initial gate-level netlist that includes a plurality of gated-clock domains. The gated-clock domains are merged by: selecting a set of initial clock gating functions that include a plurality of clock gating functions, wherein each clock gating function includes a support set of variables. A plurality of subsets of clock gating functions are defined, each subset includes a plurality of clock gating functions from the set of initial clock gating functions. A set of super clock gating functions are defined. A set of final clock gating functions are defined. For each subset of clock gating functions: a set of quantified functions are produced by existentially quantifying each clock gating function in the subset over a set of variables that are not part of the support sets of the other clock gating functions of the subset. If the set of quantified functions are equal, any one of the quantified functions is selected as a super clock gating function. The super clock gating function is added to the set of super clock gating functions. If the set of super clock gating functions contains at least one super clock gating function: the set of super clock gating functions are sorted according to a criterion. The super clock gating function that best achieves the criterion is selected. The selected super clock gating function is removed from the set of super gating functions. The selected super clock gating function is added to the set of final clock gating functions. The remaining super clock gating functions from the set of super clock gating functions are modified by preventing flip-flops gated by the selected super clock gating function from being gated by the remaining super clock gating functions. A merged gate-level netlist that includes the set of final clock gating functions is output. The merged gate-level netlist is back-annotated. A final gate-level netlist is output. The final gate-level netlist is input into a physical layout generation phase.

According to one aspect of one or more embodiments of the present invention, a system for designing a semiconductor with merged gated-clock domains includes: a microprocessor, an input device, an output device, and a storage device. The microprocessor executes instructions that perform the following: selecting a set of initial clock gating functions that include a plurality of clock gating functions, wherein each clock gating function includes a support set of variables. A plurality of subsets of clock gating functions are defined, each subset includes a plurality of clock gating functions from the set of initial clock gating functions. A set of super clock gating functions are defined. A set of final clock gating functions are defined. For each subset of clock gating functions: a set of quantified functions are produced by existentially quantifying each clock gating function in the subset over a set of variables that are not part of the support sets of the other clock gating functions of the subset. If the set of quantified functions are equal, any one of the quantified functions is selected as a super clock gating function. The super clock gating function is added to the set of super clock gating functions. If the set of super clock gating functions contains at least one super clock gating function: the set of super clock gating functions are sorted according to a criterion. The super clock gating function that best achieves the criterion is selected. The selected super clock gating function is added to the set of final clock gating functions. The selected super clock gating function is removed from the set of super gating functions. The remaining super clock gating functions from the set of super clock gating functions are modified by preventing flip-flops gated by the selected super clock gating function from being gated by the remaining super clock gating functions. A gate-level netlist is output that includes the set of final clock gating functions.

Other aspects of the present invention will be apparent from the following description and the appended claims.

DETAILED DESCRIPTION

Figure 1:
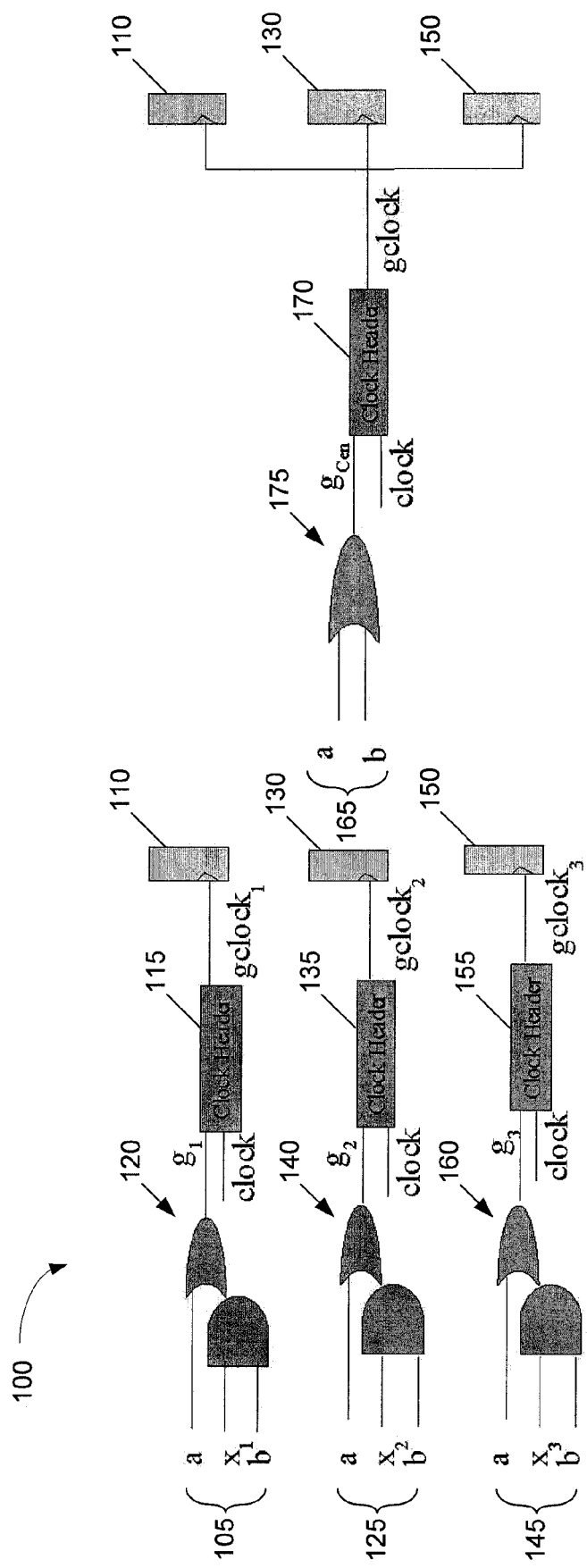
FIG. 1 shows a schematic representation of individual gated-clock domains and a corresponding merged gated-clock domain in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

In a semiconductor design flow, electronic design automation ("EDA") refers to the tool or set of tools that are utilized in the design of a semiconductor device prior to fabrication. In general, the design flow includes a logic design phase, a synthesis phase, a placement phase, and a routing phase. Sometimes, the results of one phase are back-annotated into the same phase or another phase in an attempt to optimize the design.

During the logic design phase, logic is designed in one or more hardware abstraction languages to create a high-level representation of a circuit. The output of the logic design phase is a Register-Transfer-Level ("RTL") description of the circuit. During the synthesis phase, the RTL is synthesized to create a gate-level description of the circuit. Because the logic design phase and the synthesis phase relate to the generation of logic, they are sometimes referred to collectively as the logic generation phase. During the placement phase, the gate-level netlist is utilized to floorplan the devices that constitute the circuit. During the routing phase, the connections between the devices that constitute the circuit are identified in accordance with the gate-level netlist. Because the placement phase and the routing phase concern the physical design of the semiconductor device, these phases are sometimes referred to collectively as the physical design phase.

Clock gating can be implemented at the RTL level, the gate level, or both, through manual insertion or through the use of clock gating algorithms. However, the implementation of clock gating in a semiconductor design is complicated by routing constraints and power considerations. In terms of routing constraints, it may not be physically realizable to implement all clock gating opportunities in the physical design due to a lack of routing channels in the metal layers of the design. In terms of power considerations, it may not be power efficient to implement all clock gating opportunities identified at the RTL or gate level if the power overhead in implementing a particular clock gating circuit exceeds the power savings realized by implementing the particular clock gating circuit. Thus, the challenge is to identify clock gating opportunities that are physically realizable and provide the most power efficiency.

In general terms, clock gating is implemented by routing a clock signal through a clock header to one or more flip-flops. The clock header receives as input the clock signal and an enable signal. The clock header outputs a gated clock signal to the one or more flip-flops in accordance with the state of the enable signal. The state of the enable signal is represented by a clock gating function. The clock gating function is represented by a Boolean function $f(x_1, x_2, \ldots, x_n)$, where the set of Boolean variables $\{x_1, x_2, \ldots, x_n\}$ are the support set of $f$. A minterm is a product of a set of Boolean variables. The on-set of a function $f$ is the set of minterms $m_{1(i=1 \ldots k)}$, over the support set of $f$ such that for each minterm $m_1$, $f=1$. A function $f$ implies function g ($f \Rightarrow$g) if the on-set of $f$ is a subset of the on-set of g.

For example, given a set of clock gating functions $f_1 (x_1, \ldots, x_n, y_1, \ldots, y_n)$ and $f_2 (x_1, \ldots, x_n, z_1, \ldots, z_n)$, with respective support sets $\{x_1, \ldots, x_n, y_1, \ldots, y_n\}$ and $\{x_1, \ldots, x_n, z_1, \ldots, z_n\}$, the intersection of the support sets is the set $\{x_1, \ldots, x_n\}$. A quantified function $g_1 (x_1, \ldots, x_n)$ is created for clock gating function $f_1$, such that $f_1 \Rightarrow g_1$. The quantified function $g_1 (x_1, \ldots, x_n)$ is created by existentially quantifying function $f_1$ over the set of variables that are to be removed from function $f_1$, specifically $\{y_1, \ldots, y_n\}$. Similarly, a quantified function $g_2 (x_1, \ldots, x_n)$ is created for clock gating function $f_2$, such that $f_2 \Rightarrow g_2$. The quantified function $g_2 (x_1, \ldots, x_n)$ is created by existentially quantifying function $f_2$ over the set of variables that are to be removed from function $f_2$, specifically $\{z_1, \ldots, z_n\}$. If the set of quantified functions are equivalent, then any one of the quantified functions is selected as a super clock gating function.

FIG. 1 shows a schematic representation of individual gated-clock domains and a corresponding merged gated-clock domain in accordance with one or more embodiments of the present invention. Schematic 100 represents a portion of a semiconductor design comprising individual gated-clock domains (clock gating circuits 105, 125, and 145) and a corresponding merged gated-clock domain (super clock gating circuit 165).

Clock gating circuit 105 implements clock gating function $f_1=a+bx_1$, where $f_1$, a, and b are Boolean variables. One of ordinary skill in the art will recognize that the clock gating function could be any Boolean function in any number of variables in accordance with one or more embodiments of the present invention. Clock header 115 receives as input the clock signal and an enable signal generated by logic circuit 120 that corresponds to the clock gating function $f_1$. One of ordinary skill in the art will recognize that the logic circuit could be any combinatorial logic circuit in any number of inputs in accordance with one or more embodiments of the present invention. When the enable signal is asserted, clock header 115 outputs a gated clock signal to flip-flop 110 in accordance with the clock gating function $f_1$.

Clock gating circuit 125 implements clock gating function $f_2=a+bx_2$, where $f_2$, a, and b are Boolean variables. Clock header 135 receives as input the clock signal and an enable signal generated by logic circuit 140 that corresponds to the clock gating function $f_2$. When the enable signal is asserted, clock header 135 outputs a gated clock signal to flip-flop 130 in accordance with the clock gating function $f_2$.

Clock gating circuit 145 implements clock gating function $f_1=a+bx_3$, where $f_3$, a, and b are Boolean variables. Clock header 155 receives as input the clock signal and an enable signal generated by logic circuit 160 that corresponds to the clock gating function $f_3$. When the enable signal is asserted, clock header 155 outputs a gated clock signal to flip-flop 150 in accordance with the clock gating function $f_3$.

Clock gating circuits 105, 125, and 145 represent individual gated-clock domains because each circuit gates the clock signal to a single flip-flop. As such, the power overhead in implementing clock gating circuits 105, 125, and 145 exceeds the power savings realized by the clock gating. Because there is no net power savings, these clock gating circuits would not be implemented during the physical design of a semiconductor device. Additionally, it may not be feasible to physically implement the individual gated-clock domains in one or more metal layers of the semiconductor device for lack of routing channels or coupling.

Super clock gating circuit 165 implements super clock gating function $f_{common}$ that gates the provision of the clock signal to flip-flops 110, 130, and 150 through clock header 170. Clock header 170 receives as input the clock signal and an enable signal generated by logic circuit 175 that corresponds to the super clock gating function $f_{common}$. When the enable signal is asserted, clock header 170 outputs a gated clock signal to flip-flops 110, 130, and 150 in accordance with the clock gating function $f_{common}$. One of ordinary skill in the art will recognize that super clock gating circuit 165 gates the provision of the clock signal to flip-flops 110, 130, and 150 in the same manner as clock gating circuits 105, 125, and 145 respectively. As such, the individual gated-clock domains are merged to produce the merged gated-clock domain.

Given clock gating functions $f_1$ (a, b, $x_1$), $f_2$ (a, b, $x_2$), and $f_3$ (a, b, $x_3$) with respective support sets {a, b, $x_1$}, {a, b, $x_2$}, and {a, b, $x_3$}, the intersection of the support sets is the set {a, b}. A quantified function $g_1$ (a, b) is created for clock gating function $f_1$, such that $f_j \Rightarrow g_1$. The quantified function $g_1$ (a, b) is created by existentially quantifying function $f_1$ over the set of variables that are to be removed from function $f_1$, specifically {$x_1$}. Similarly, a quantified function $g_2$ (a, b) is created for clock gating function $f_2$, such that $f_2 \Rightarrow g_2$. The quantified function $g_2$ (a, b) is created by existentially quantifying function $f_2$ over the set of variables that are to be removed from function $f_2$, specifically {$x_2$}. A quantified function $g_3$ (a, b) is created for clock gating function $f_1$, such that $f_3 \Rightarrow g_3$. The quantified function $g_3$ (a, b) is created by existentially quantifying function $f_3$ over the set of variables that are to be removed from function $f_3$, specifically {$x_3$}. In this instance, $g_1 = g_2 = g_3 = a+b$, which does not include the non-common terms from the support sets of functions $g_1$, $g_2$, and $g_3$. As such, $g_{common} = a+b$ is selected as the super clock gating function implemented by logic circuit 175. Super clock gating circuit 165 is functionally equivalent to clock gating circuits 105, 125, and 145 in terms of gating the provision of the clock signal to each of flip-flops 110, 130, and 150. Advantageously, super clock gating circuit 165 is more likely to be physically realizable and more power efficient than clock gating circuits 105, 125, and 145.

Figure 2A:
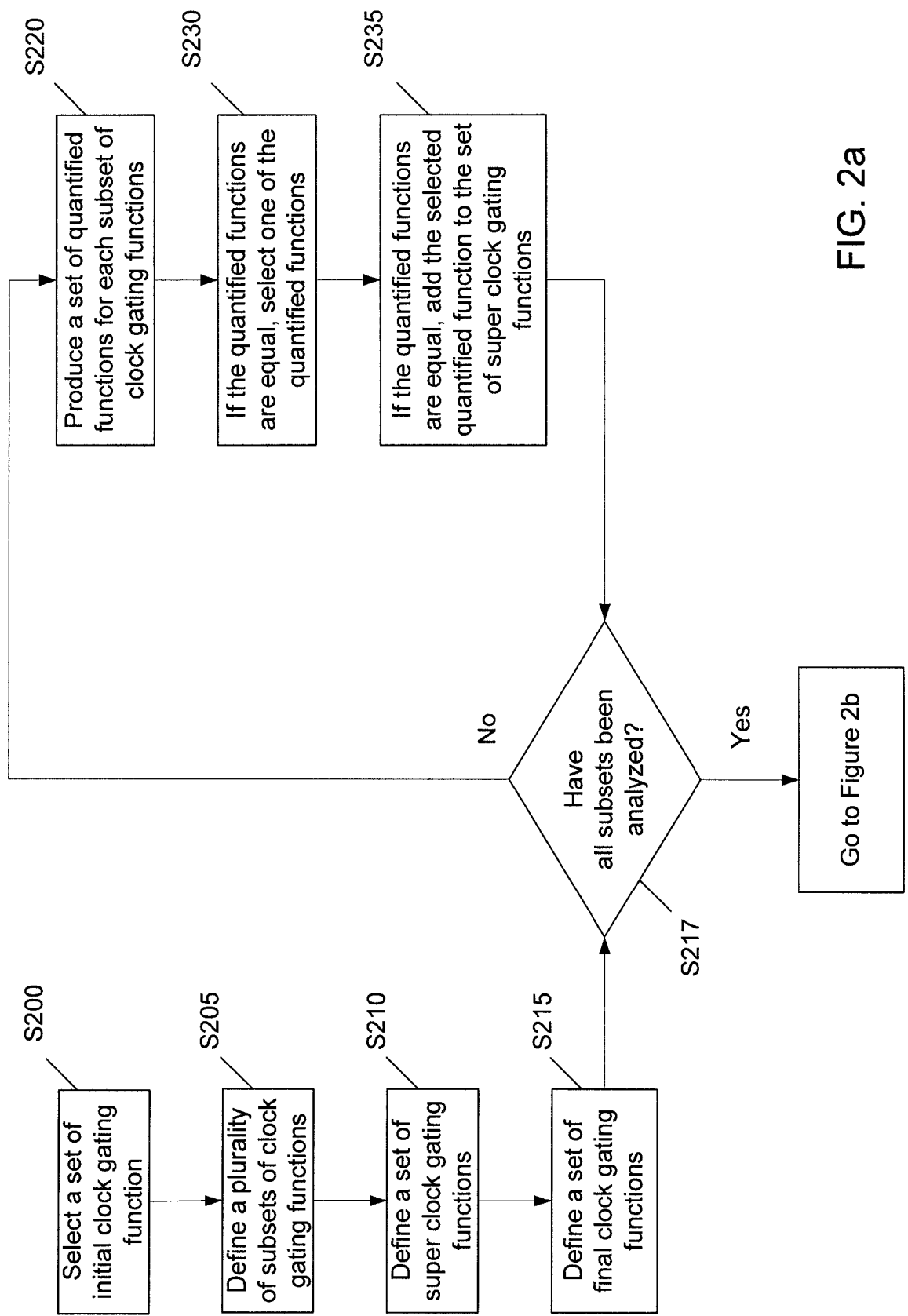
FIGS. 2a and 2b show a method of merging gated-clock domains in a semiconductor design flow in accordance with one or more embodiments of the present invention.
Figure 2B:
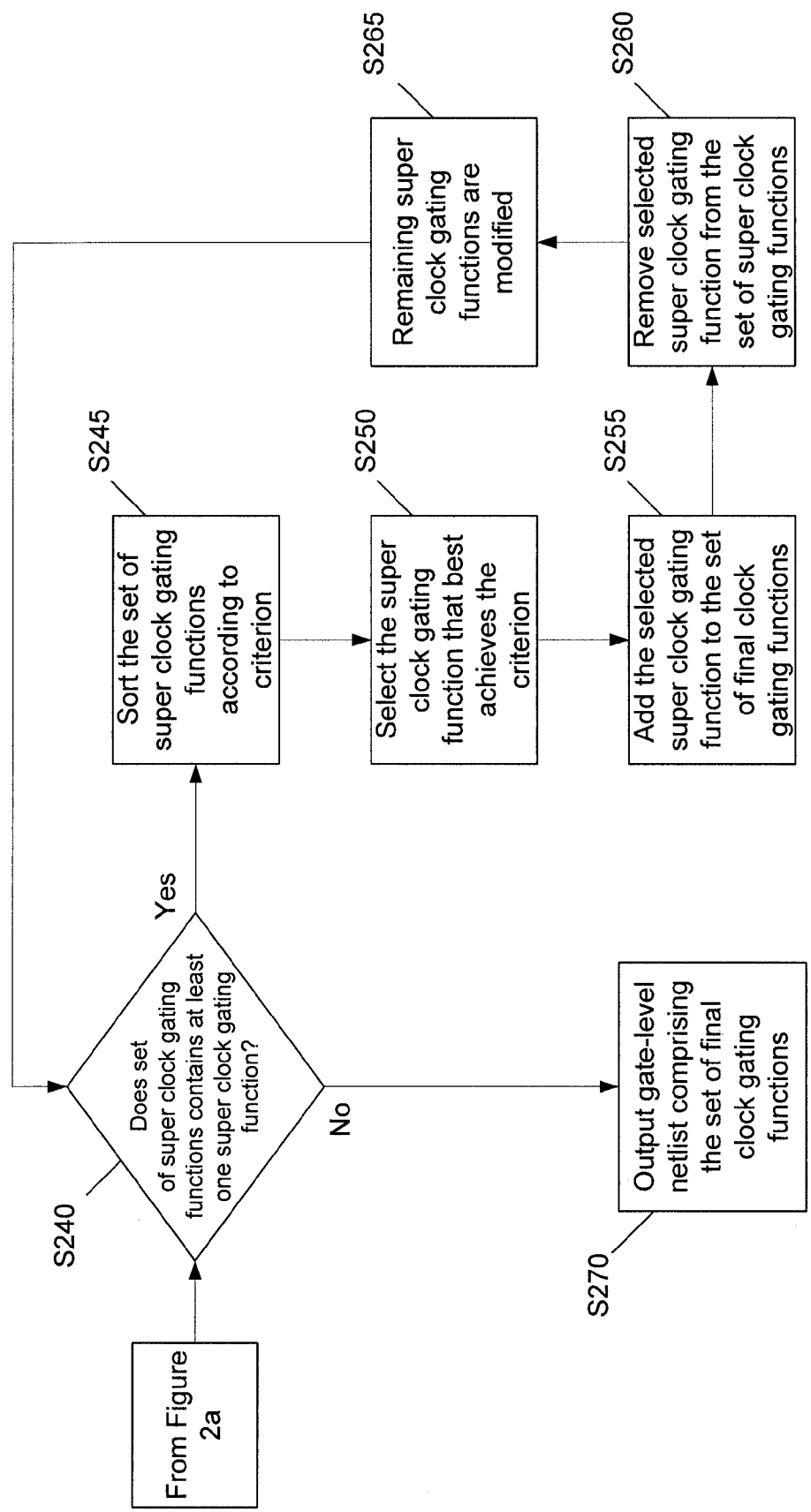

FIGS. 2a and 2b show a method of merging gated-clock domains in a semiconductor design flow in accordance with one or more embodiments of the present invention. In FIG. 2a, in step S200, a set of initial clock gating functions are selected. The initial set of clock gating functions could be selected from the RTL level or the gate level of the design flow. The set of initial clock gating functions includes a plurality of clock gating functions that each comprises a support set of variables.

In step S205, a plurality of subsets of clock gating functions are defined, where each subset comprises a plurality of clock gating functions from the initial set of clock gating functions. In one or more embodiments of the present invention, each subset is comprised of a pair of clock gating functions from the initial set of clock gating functions. In step S210, a set of super clock gating functions is defined. This set is initially an empty set. In step S215, a set of final clock gating functions is defined. This set is initially an empty set.

In step S217, a determination is made as to whether all subsets of clock gating functions have been analyzed. If yes, then step S240 is performed. If no, for each subset of clock gating functions, steps S220 through S235 are performed. In step S220, a set of quantified functions are produced by existentially quantifying each clock gating function in the subset over a set of variables that are not part of the support sets of the other clock gating functions of the subset. In step S230, a determination is made as to whether the set of quantified functions are equal. If all quantified functions in the set of quantified functions are equal, then any one of the quantified functions is selected as a super clock gating function. In step S235, if the determination is made that the quantified functions are equal, the super clock gating function is added to the set of super clock gating functions.

In FIG. 2b, once all subsets have been analyzed, in step S240 a determination is made as to whether the set of super clock gating functions contains at least one super clock gating function. If no, step S270 is performed. If yes, the set of super clock gating functions contains at least one super clock gating function and steps S245 through S265 are performed.

In step S245 the set of super clock gating functions are sorted according to a criterion. The criterion may be the number of gated flip-flops per clock header, clock gating efficiency, and support size of the function. One of ordinary skill in the art will recognize that other criterion may be employed in accordance with one or more embodiments of the present invention. In step S250, the super clock gating function that best achieves the criterion is selected.

In step S255, the selected super clock gating function is added to the set of final clock gating functions. In step S260, the selected super clock gating function is removed from the set of super gating functions. In step S265, the remaining super clock gating functions from the set of super clock gating functions are modified by preventing flip-flops gated by the selected super clock gating function from being gated by the remaining super clock gating functions. When the set of super clock gating functions is empty, in step 270, a gate-level netlist that comprises the set of final clock gating functions is output.

Figure 3:
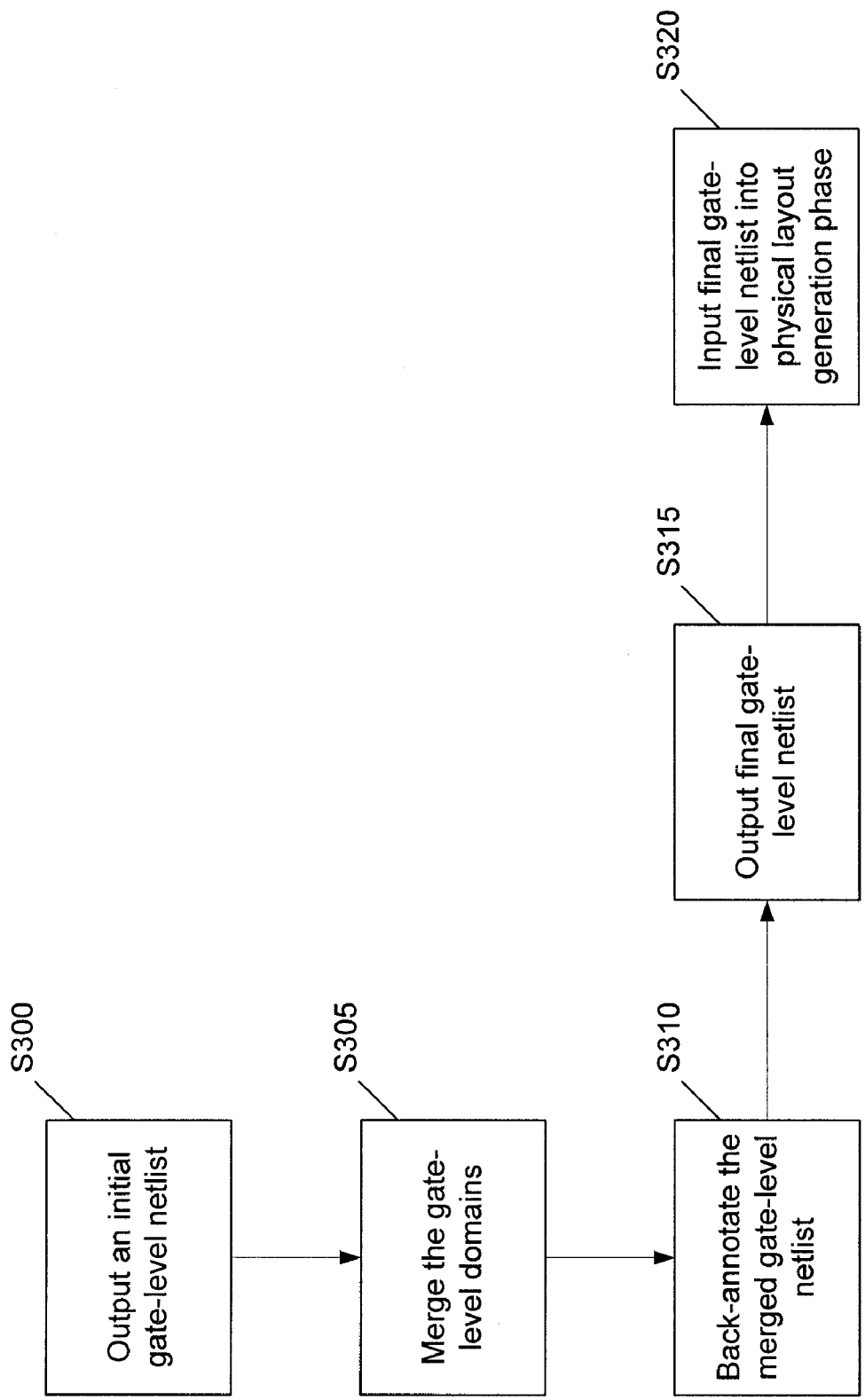
FIG. 3 shows a method of implementing merged gated-clock domains in a semiconductor design flow in accordance with one or more embodiments of the present invention.

FIG. 3 shows a method of implementing merged gated-clock domains in a semiconductor design flow in accordance with one or more embodiments of the present invention. The design flow for a semiconductor device includes a logic generation phase and a physical layout generation phase. The present method is performed as part of the logic generation phase and is back-annotated into the logic generation phase or the physical design phase.

In step 300, a RTL design is synthesized to output an initial gate-level netlist that comprises a plurality of gated-clock domains. In step 305, the gate-clock domains are merged according to the method described in FIGS. 2a and 2b to produce a merged gate-level netlist. In step 310, the merged gate-level netlist is back-annotated into the logic generation phase or the physical design phase. In step 315, a final gate-level netlist is output. In Step 320, the final gate-level netlist is input into the physical design phase.

Figure 4B:
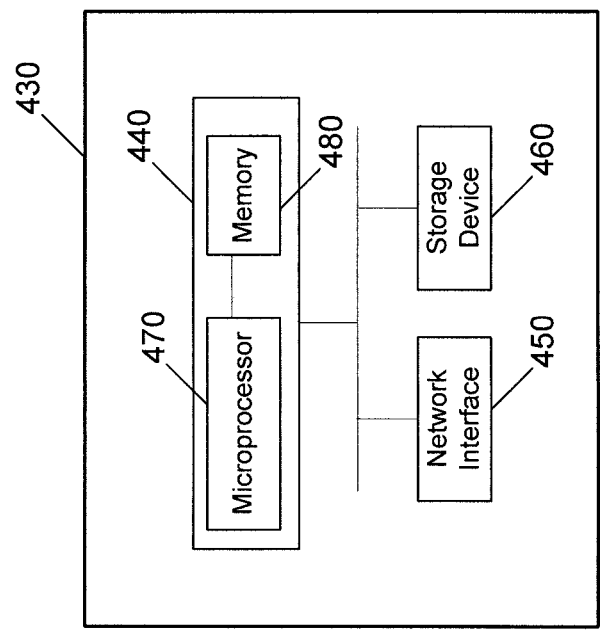
FIGS. 4a and 4b shows a system for designing a semiconductor with merged gated-clock domains in accordance with one or more embodiments of the present invention.
Figure 4A:
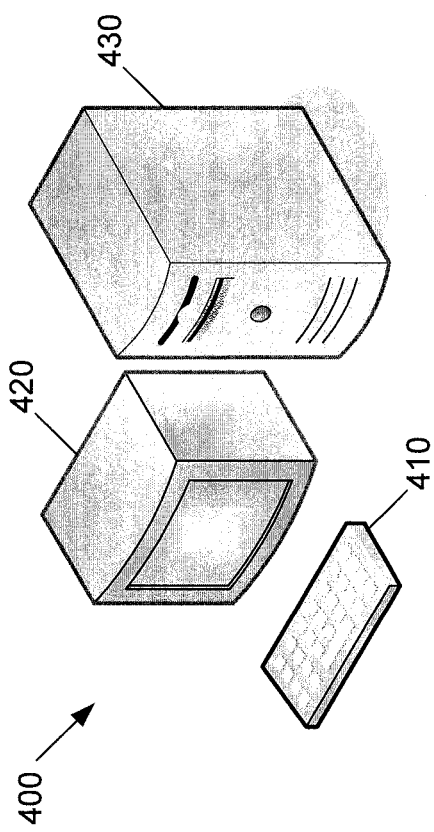

FIGS. 4a and 4b show a system in accordance with one or more embodiments of the present invention. A system 400 includes an input device 410, an output device 420, and a mechanical chassis 430. The mechanical chassis 430 includes, for example, a printed circuit board 440, a network interface 450, and a storage device 460. The printed circuit board 440 includes a microprocessor 470 and memory 480. The microprocessor 450 executes instructions stored on the storage device 460 or a device connected to the network interface 450 using the memory 480 so as to perform one or more the methods described in FIGS. 2a, 2b, and 3.

Advantages of one or more embodiments of the present invention may include one or more of the following.

In one or more embodiments of the present invention, physically realizable and power efficient clock gating can be achieved by merging gated-clock domains. In one or more embodiments of the present invention, power efficiencies can be achieved that more closely track that anticipated during the RTL and/or gate level of the design. In one or more embodiments of the present invention, the methods can be implemented at the RTL level, gate level, or both during any appropriate phase of the semiconductor design flow.

In one or more embodiments of the present invention, the number of gated-clock domains is reduced. In one or more embodiments of the present invention, the number of clock headers is reduced. In one or more embodiments of the present invention, the number of flip-flops that can be grouped and gated together under the same clock header is increased.

In one or more embodiments of the present invention, each merged gated-clock domain is power efficient. In one or more embodiments of the present invention, each merged gated-clock domain has a simplified clock gating function. In one or more embodiments of the present invention, each merged gated-clock domain is physically realizable within the constraints of metal layer routing channels.

In one or more embodiments of the present invention, one or more merged gated-clock domains can be implemented in a central processing unit ("CPU") or graphics processor unit ("GPU").

In one or more embodiments of the present invention, one or more merged gated-clock domains can be implemented on a field programmable gate array ("FGPA") or other programmable logic devices.

In one or more embodiments of the present invention, one or more merged gated-clock domains can be implemented in any semiconductor device utilizing a clock tree.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of merging gated-clock domains in a semiconductor design comprising:
  selecting, by a computer processor, a set of initial clock gating functions comprising a plurality of clock gating functions, wherein each clock gating function comprises a support set of variables;
  defining, by the computer processor, a plurality of subsets of clock gating functions, each subset comprising a plurality of clock gating functions from the set of initial clock gating functions;
  defining a set of super clock gating functions;
  defining a set of final clock gating functions;
  for each subset of clock gating functions:
    producing a set of quantified functions by existentially quantifying each clock gating function in the subset over a set of variables that are not part of the support sets of the other clock gating functions of the subset;
    when the set of quantified function are equal, selecting any one of the quantified functions as a super clock gating function;
    adding the super clock gating function to the set of super clock gating functions;
    when the set of super clock gating function contains at least one super clock gating function:
      sorting the set of super clock gating functions according to a criterion;
      selecting the super clock gating function that best achieves the criterion;
      adding the selected super clock gating function to the set of final clock gating functions;
      removing the selected super clock gating function from the set of super gating functions;
      modifying the remaining super clock gating functions from the set of super clock gating functions by preventing flip-flops gated by the selected super clock gating function from being gated by the remaining super clock gating functions; and
  outputting a gate-level netlist that comprises the set of final clock gating functions.

2. The method of claim 1, wherein each subset is comprised of a pair of clock gating functions.

3. The method of claim 1, wherein the criterion is a number of gated flip-flops.

4. The method of claim 1, wherein the criterion is a clock gating efficiency.

5. The method of claim 1, wherein the criterion is a function support size.

6. A method of implementing merged gated-clock domains in a semiconductor design comprising:
  outputting, by a computer processor, an initial gate-level netlist that comprises a plurality of gated-clock domains;
  merging, by a computer processor, the gated-clock domains, wherein the merging comprises:
    selecting a set of initial clock gating functions comprising a plurality of clock gating functions, wherein each clock gating function comprises a support set of variables;
    defining a plurality of subsets of clock gating functions, each subset comprising a plurality of clock gating functions from the set of initial clock gating functions;
    defining a set of super clock gating functions;
    defining a set of final clock gating functions;
    for each subset of clock gating functions:
      producing a set of quantified functions by existentially quantifying each clock gating function in the subset over a set of variables that are not part of the support sets of the other clock gating functions of the subset;
      when the set of quantified function are equal, selecting any one of the quantified functions as a super clock gating function;
      adding the super clock gating function to the set of super clock gating functions;
      when the set of super clock gating function contains at least one super clock gating function:
        sorting the set of super clock gating functions according to a criterion;
        selecting the super clock gating function that best achieves the criterion;
        removing the selected super clock gating function from the set of super gating functions;
        adding the selected super clock gating function to the set of final clock gating functions;
        modifying the remaining super clock gating functions from the set of super clock gating functions by preventing flip-flops gated by the selected super clock gating function from being gated by the remaining super clock gating functions; and
      outputting a merged gate-level netlist that comprises the set of final clock gating functions;
  back-annotating the merged gate-level netlist;
  outputting a final gate-level netlist; and inputting the final gate-level netlist into a physical layout generation phase.

7. The method of claim 6, wherein each subset is comprised of a pair of clock gating functions.

8. The method of claim 6, wherein the criterion is a number of gated flip-flops.

9. The method of claim 6, wherein the criterion is a clock gating efficiency.

10. The method of claim 6, wherein the criterion is a function support size.

11. A system for designing a semiconductor with merged gated-clock domains comprising:
   a microprocessor;
   an input device;
   an output device; and
   a storage device,
   wherein the microprocessor executes instructions that perform the following:
      selecting a set of initial clock gating functions comprising a plurality of clock gating functions, wherein each clock gating function comprises a support set of variables;
      defining a plurality of subsets of clock gating functions, each subset comprising a plurality of clock gating functions from the set of initial clock gating functions;
      defining a set of super clock gating functions;
      defining a set of final clock gating functions;
      for each subset of clock gating functions:
         producing a set of quantified functions by existentially quantifying each clock gating function in the subset over a set of variables that are not part of the support sets of the other clock gating functions of the subset;
         when the set of quantified function are equal, selecting any one of the quantified functions as a super clock gating function;
         adding the super clock gating function to the set of super clock gating functions;
      when the set of super clock gating function contains at least one super clock gating function:
         sorting the set of super clock gating functions according to a criterion;
         selecting the super clock gating function that best achieves the criterion;
         adding the selected super clock gating function to the set of final clock gating functions;
         removing the selected super clock gating function from the set of super gating functions;
         modifying the remaining super clock gating functions from the set of super clock gating functions by preventing flip-flops gated by the selected super clock gating function from being gated by the remaining super clock gating functions; and
      outputting a gate-level netlist that comprises the set of final clock gating functions.

12. The method of claim 11, wherein each subset is comprised of a pair of clock gating functions.

13. The method of claim 11, wherein the criterion is a number of gated flip-flops.

14. The method of claim 11, wherein the criterion is a clock gating efficiency.

15. The method of claim 11, wherein the criterion is a function support size.

* * * * *